(12) United States Patent
Commons

(10) Patent No.: US 9,250,759 B1
(45) Date of Patent: Feb. 2, 2016

(54) VISUAL REPRESENTATION OF USER-NODE INTERACTIONS

(75) Inventor: Peter V. Commons, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 489 days.

(21) Appl. No.: 12/842,415

(22) Filed: Jul. 23, 2010

(51) Int. Cl.
*G06F 3/048* (2013.01)
*G06F 15/177* (2006.01)

(52) U.S. Cl.
CPC ..................... *G06F 3/048* (2013.01)

(58) Field of Classification Search
USPC .................................................. 715/772, 736
See application file for complete search history.

(56) References Cited

U.S. PATENT DOCUMENTS

| | | | |
|---|---|---|---|
| 7,043,702 B2 * | 5/2006 | Chi ................... | G06F 17/30873 707/E17.111 |
| 7,792,844 B2 * | 9/2010 | Error et al. ..................... | 707/754 |
| 8,046,357 B2 * | 10/2011 | Gulli et al. ..................... | 707/726 |
| 8,099,491 B2 * | 1/2012 | Error ............................. | 709/224 |
| 8,166,155 B1 * | 4/2012 | Rachmeler et al. ........... | 709/224 |
| 8,234,582 B1 | 7/2012 | Haynes et al. | |
| 8,250,473 B1 | 8/2012 | Haynes et al. | |
| 8,341,540 B1 * | 12/2012 | Haynes ............. | G06F 17/30126 715/736 |
| 2002/0040394 A1 * | 4/2002 | Shapira ............... | H04L 12/2602 709/224 |
| 2002/0087679 A1 * | 7/2002 | Pulley ................... | G06Q 30/02 709/224 |
| 2003/0033378 A1 * | 2/2003 | Needham ............ | G06F 17/3089 709/218 |
| 2003/0115333 A1 * | 6/2003 | Cohen ................. | G06F 17/3089 709/227 |
| 2004/0059746 A1 * | 3/2004 | Error ..................... | G06F 11/323 |
| 2004/0174397 A1 * | 9/2004 | Cereghini .............. | G06Q 30/02 715/855 |
| 2006/0036400 A1 * | 2/2006 | Kasriel ............... | G06F 17/3089 702/182 |
| 2006/0149728 A1 * | 7/2006 | Error ..................... | G06F 11/323 |
| 2006/0212459 A1 * | 9/2006 | Sugimura ............. | G06Q 30/02 |
| 2007/0112730 A1 * | 5/2007 | Gulli ................. | G06F 17/30864 |
| 2008/0313125 A1 * | 12/2008 | Galvin .............. | G06F 17/30864 706/52 |
| 2009/0037579 A1 * | 2/2009 | Error ..................... | G06Q 30/02 709/224 |
| 2009/0089714 A1 * | 4/2009 | Blake et al. ................... | 715/850 |
| 2009/0275313 A1 * | 11/2009 | Haleva et al. .............. | 455/414.1 |
| 2009/0293001 A1 * | 11/2009 | Lu et al. ....................... | 715/745 |
| 2009/0319538 A1 * | 12/2009 | Bean ........................... | 707/10 |
| 2009/0327402 A1 * | 12/2009 | Bernstein ............ | H04L 12/2602 709/203 |
| 2009/0327424 A1 * | 12/2009 | Bernstein ............... | G06Q 10/06 709/205 |
| 2010/0049847 A1 * | 2/2010 | Muret et al. .................. | 709/224 |
| 2010/0312884 A1 * | 12/2010 | Nandy et al. .................. | 709/224 |
| 2011/0055710 A1 * | 3/2011 | Kirkby .................... | G06Q 30/02 715/736 |
| 2011/0119100 A1 * | 5/2011 | Ruhl et al. .................... | 705/7.11 |
| 2012/0075324 A1 * | 3/2012 | Cardno et al. ................ | 345/589 |

* cited by examiner

*Primary Examiner* — William Bashore
*Assistant Examiner* — Henry Orr
(74) *Attorney, Agent, or Firm* — Lee & Hayes, PLLC

(57) ABSTRACT

A user interface displays visual representations of user interaction with a series of nodes in a defined pipeline. The pipeline includes several nodes in a defined order with a starting node and an ending node. Each of the nodes is represented by a symbol, such as a circle, with elements, such as arrows, showing the movement of users to and from the respective nodes. User movement to a node outside of the pipeline nodes may also be shown with arrows or other elements. In some implementations such as web analytics, the nodes may be webpages and the users may be viewers who browse from one page to the next. One illustrative pipeline may be a series of webpages that a viewer interacts with in order to complete an online purchase.

31 Claims, 9 Drawing Sheets

VISUAL REPRESENTATION OF USER-NODE INTERACTIONS

BACKGROUND

The prevalence, diversity, and economic value of electronic commerce have increased dramatically as Internet use has grown. Retailers that participate in this electronic commerce often do so by maintaining a website for potential customers to view and purchase goods and services. Accordingly, studying the way people interact with retail websites can yield important insights about how to attract customers and close sales. This interest in electronic commerce, specifically web-based sales, has led to the development of web analytics, which is the study of Internet data derived from users interacting with webpages.

The Internet data used for web analytics may be provided by computers in a numerical or tabular form, such as in a web server log file that records transactions that occurred on a web server. However, the raw data presented in this numerical or tabular form may be difficult for people to interpret. Therefore, various techniques for displaying this data in a visual or graphical form have been developed. However, the visualization techniques developed thus far are not able to show interactions between customers and websites with sufficient clarity and detail. Some visualization techniques suffer from oversimplification in which important details are not presented graphically while other visualizations are overly complex and difficult to interpret.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
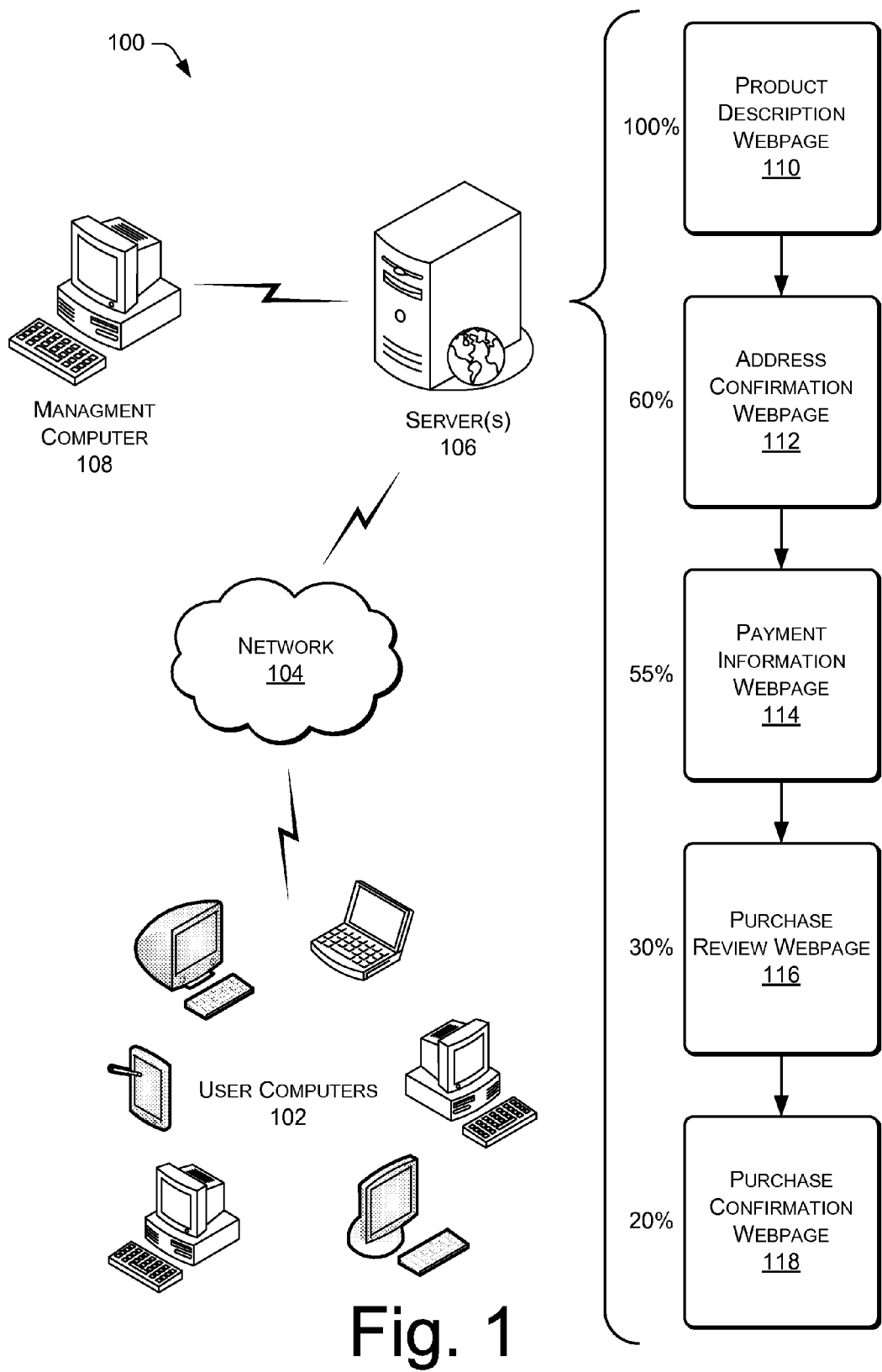
FIG. 1 shows an illustrative architecture for obtaining data from and analyzing a pipeline of webpages.

One goal of web analytics is to view and analyze customer behavior, specifically how customers navigate (or fail to navigate) a particular set of webpages. A set of webpages that users are expected to view in a particular order may be referred to as a "pipeline." One type of pipeline that is important in Internet commerce is a checkout pipeline. The checkout pipeline includes the webpages that a user views to purchase a selected item. The percentage of the viewers that end up purchasing the item after selection of the item is sometimes referred to as the "conversion rate." Electronic retailers understandably want to maximize this conversion rate and may attempt to do so by analyzing Internet data to identify potential reasons that users abandon the checkout pipeline prior to completing a purchase. With this knowledge, a retailer may modify a website design, website content, product pricing, etc. in an attempt to improve the conversion rate.

At each step in a pipeline (e.g., the checkout pipeline) users may abandon the pipeline so that the percentage of starting users that move through each step in the pipeline decreases. This may be represented graphically as a "funnel" that is largest at the start of the pipeline and narrows to represent users abandoning the pipeline. A funnel shows attrition of users through the pipeline. However, other aspects of user behavior are not shown by visualizing the pipeline as a funnel. For example, the destinations users go to when they leave the pipeline are not shown in a funnel. Users that move around within the pipeline and/or skip steps of the pipeline may be difficult to show in a funnel. This type of data may be presented in a textual or tabular form, but textual or tabular representation lacks the advantages of an easily understood graphical representation.

An alternative graphical representation of user movement through a pipeline is a "bowl" view, in which each of the webpages are represented as points along a cross-section of a bowl. User attrition through the pipeline may be shown by decreasing the size of each webpage representation (e.g., a smaller visual representation of a webpage indicates fewer users). Movement along the pipeline may be shown by arrows connecting each of the webpage representations. Instances in which users move between webpages in a way other than the normal pipeline flow (e.g. backwards or skipping webpages) may be shown by additional arrows between the webpage representations.

Since the series of webpages in the pipeline is represented in a bowl or curve shape, a straight line may connect any two webpage representations without crossing over other webpage representations. Furthermore, lines that point to some place other than one of the webpage representations can illustrate users leaving the pipeline and also show where those users are going after they leave the pipeline. The size of the lines, both between webpages in the pipeline and to points outside of the pipeline, can show the relative number of users traveling the path represented by that line. For example, the sizes of the respective lines radiating from a webpage representation may provide an intuitive visual indicator of where users go after viewing that webpage.

Additional data not shown in the graphical representation may be represented in a table or text that accompanies the graphic. However the non-graphical data may be integrated with the graphical representation through the use of pop-up windows, text boxes, or similar display techniques. For example, rather than looking at an entirely separate table of data, selection of one of the webpage representations may provide further data about user interactions with that webpage in a text box that is overlaid onto the graphical representation of the entire pipeline.

Although aspects of this disclosure are presented in the context of webpages and electronic commerce, the concepts related to visual displays of user interaction with pipelines have wider applicability. A pipeline can be generalized as any series of waypoints or nodes. When the nodes are webpages, the concept of a user traveling between nodes represents the human user directing his or her web browser software to stop displaying one webpage and start displaying a different webpage. Changes in the viewing of a single webpage may also be analyzed as separate nodes. For example, clicking on a link to move from the top of a webpage to the bottom of that same webpage may be analyzed as moving from one node to another node. Also, changes in webpage technology such as Asynchronous JavaScript and XML programming (Ajax) allow the user to perceive a webpage transition without requiring a server to send a new webpage to the user. Thus webpages, and of course nodes, include discrete computer-generated graphical presentations that may be displayed on a user interface. Thus, a transition between nodes would be a change from one discrete computer-generated presentation to another discrete computer-generated presentation (this would be considered a transition even if both presentations are part of a same "webpage"). In other contexts, the user may be any entity that moves between the nodes. For example, the users may be vehicles and the nodes may be geographical locations (e.g., trucks moving between cities). In different electronic or data processing contexts, the users may be pieces of information and the nodes may be routing points on the information network (e.g., packets and network switches). These and other examples are included within the scope of this disclosure.

Illustrative Architecture

FIG. 1 shows an illustrative architecture 100 in which a pipeline, specifically an illustrative website checkout pipeline, may be created and analyzed. A plurality of user computers 102 access a network 104, such as the Internet. The user computers 102 may include desktop computers, notebook computers, tablet computers, thin clients, mobile devices, or any other type of computing device capable of displaying a webpage. The network 104 may connect to user computers to a server(s) 106 such as a web server that hosts a website. The server(s) 106 may be a single computing device or multiple computing devices such as a server farm. The hosting of the website may be done on a single server(s) 106 or spread across multiple servers/server farms which could be managed by different entities. A management computer 108 may be connected to the server(s) 106 either directly, through an intranet, or through the same network 104 at the user computers 102. The management computer 108 may control the server(s) 106, and thus, the website hosted on the server(s) 106. The management computer 108 may also view web analytics derived from the actions of the user computers 102 with the website hosted by the server(s) 106. The web analytics and user interface generation described herein below may be performed on the server(s) 106 that hosts the website, another server computer, or the management computer 108. The web analytics including graphical user interfaces may be presented on a display of the management computer 108.

The website hosted by the server(s) 106 may include many hundreds or thousands of webpages. Every webpage presented to viewers may be generated by a distinct file or collection of files; however, in some implementations template pages or shared elements may be used to generate many different webpages. This can lead to categorization and hierarchies of webpages. For example, each webpage that is based on a same template may be identified as having a same page type. Similarly, there may be further refinements of relationships and similarities between webpages leading to sub-page types, sub-subpage types, etc.

In one illustrative example, the website may be a website of an online retailer for selling goods and services to people that access that website. A user operating the management computer 108 may select several webpages for inclusion in a pipeline. Although certain sequences of webpages, such as those a user views during the checkout process, may logically lend themselves to representation as a pipeline, any webpages may be included in a pipeline. The user designing the pipeline may also select the sequence of the webpages in the pipeline by indicating which page is the start page, which page is the end page, and an order of any intermediate pages.

The illustrative webpages shown in FIG. 1 are pages from a checkout pipeline. This pipeline begins with a product description webpage 110 that describes a particular product for sale and provides links, buttons, etc. for a viewer to initiate a purchase of that product. This page 110 is defined, in this example, as the start page of the pipeline. Any viewers that land on page 110 enter the pipeline and their interactions may be tracked as part of the analytics for this pipeline. When a user browses to the product description webpage 110, or generally, when a user arrives at the starting node of any pipeline, this arrival may trigger analysis of that user's subsequent interactions. Since users that reach the start node of the pipeline are defined as the set of users which is analyzed in the context of the pipeline, the percentage of users at the product description webpage 110 is, by definition, 100%.

This pipeline proceeds to an address confirmation webpage 112, which is presented to those users that have chosen to purchase the item from the product description page 110. As the name suggests, users that reach the address confirmation webpage 112 may be asked to confirm that a saved address is correct or enter their shipping and/or billing address. Note that each individual user may see a slightly different webpage that shows his or her stored address. By defining the second node in this pipeline to include a general page type of address confirmation webpages, each user that goes to an address confirmation webpage 112 (even though the specific page that user views may have a different address on it than the page viewed by other users) the definition of this node is generalized sufficiently to meaningfully capture aggregate user behavior. In this illustrative example, 40% of the users have gone elsewhere after viewing the product description webpage 110 so that only 60% of the users that enter the pipeline proceeded to the address confirmation webpage 112.

After the address confirmation webpage 112, this pipeline proceeds to the payment information webpage 114. Here, the users may enter payment information, choose to use saved payment information, or otherwise pay for the product the wish to purchase. In this example, only 5% of the original users abandoned the pipeline between the previous webpage 112 and this webpage page 114 leaving 55% of the original users in the pipeline at the payment information webpage 114. Although the percentages in FIG. 1 are shown as percentages of users relative to the number of users at the start page (i.e., the product description webpage 110) percent information may also be presented as a percent relative to the previous webpage. For example, the decrease from 60% of the starting users to 55% of the starting users between webpage 112 and webpage 114 represents a decrease of approximately 8%, so the 55% value associated with webpage 114 could alternatively be displayed as a 92% value. The user viewing the pipeline analytics at the management computer 108 may choose to switch the basis for calculating percent of attrition at any time.

Following the payment information webpage 114, the pipeline may include a purchase review webpage 116. The purchase review webpage may provide the user a final opportunity to confirm details of the purchase such as the product, address information, and payment information. Here, the percentage of users drops from 55% at the payment information webpage 114 to 30% at the purchase review webpage 116. This drop may signal a potential problem with the checkout pipeline. The problem could be technical in nature regarding the way the server(s) 106 generates the purchase review webpage 116. The problem could also be related to the content of the purchase review webpage 116 such as, for example, if this is the first time users are presented with shipping costs and the cost is high many users may choose to abandon the purchase at this point. A high-level view of a pipeline analysis may show where potential problems exist, but may not identify potential causes for those problems. However, a more detailed analysis of user interaction with the pipeline, such as looking at specific browsing sessions of a subset of users, may suggest potential causes for abandonment. The specific browsing sessions of users may provide information on a few users randomly selected from all those users who share a particular characteristic. For example, detailed web browsing data could be provided for 10 randomly selected users who abandoned the pipeline after viewing webpage 114.

The last step, or node, in this illustrative pipeline is the purchase confirmation webpage 118. Here, the users receive confirmation that the purchase is complete. As mentioned above, maximizing the percent of users in the pipeline that reach this webpage may be one goal of retail websites and Internet merchants. In this example, 20% of the users that enter the pipeline at webpage 110 purchase the product and view the purchase confirmation webpage 118.

The subsequent discussion of illustrative user interfaces refers to the checkout pipeline and the webpages 110-118 shown in FIG. 1. However, it is to be understood that the specific webpages in this checkout pipeline are illustrative examples of nodes and the user interfaces are equally applicable for displaying user-node interaction in other contexts.

Illustrative User Interfaces

Figure 2:
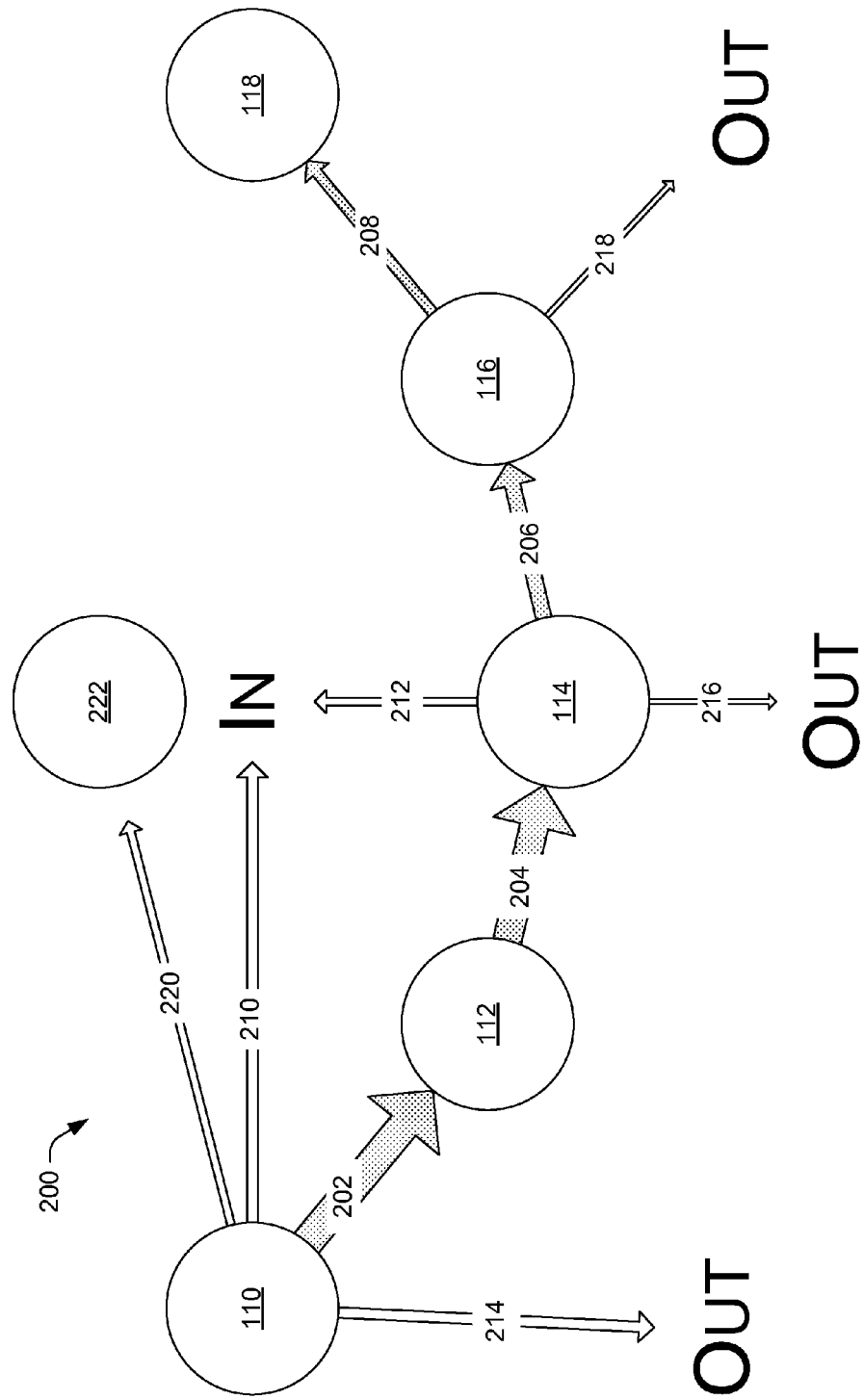
FIG. 2 shows an illustrative user interface of nodes arranged in a curve with arrows indicating the movement of users amongst the nodes and to other internal and external nodes.

FIG. 2 shows a user interface 200 with circles representing each of the nodes (i.e., webpages) 110-118 from the checkout pipeline introduced in FIG. 1. Although circles are shown here other shapes or images such as squares, triangles, small icons, screen shots of the webpages, and the like may also be used to represent the nodes in the pipeline. In this illustrative arrangement, the starting node 110 is at the top left, the intermediate nodes 112, 114, and 116 are arranged in sequential order in a curve and the last node 118 is shown at the top right. Of course the ordering from left to right may be reversed and the curve may be flipped from a bowl (i.e., with the "opening" facing up) to a dome (i.e., with "opening" facing down).

Connecting lines 202, 204, 206, and 208 represent the users, or "traffic," moving between two of the nodes in the pipeline. For example the connecting line 202 between node 110 and node 112 may represent the 60% of users that went from the product description webpage 110 to the address confirmation webpage 112. A thickness of each connecting line 202, 204, 206, and 208 may be proportional to a number of users moving between the two nodes. For example, the attrition of users over the course of this pipeline is visually represented by the progressive narrowing of the connecting lines 202, 204, 206, and 208. The connecting lines 202, 204, 206, and 208 may include indicia of directionality showing the direction of movement of users between the nodes. The indicia of directionality may be an arrowhead as shown in FIG. 2 or any other type of indicia such as chevrons, color gradations, a changing of line thickness, or the like.

The connecting lines 202, 204, 206, and 208 represent user movement within the pipeline, but users may abandon the pipeline and move to a node that is not included in the definition of the pipeline. These users abandoning the pipeline may be represented by exit lines 210, 212, 214, 216, 218, and 220 extending from the last node in the pipeline visited by the abandoning user to another a region of the user interface. Like the connecting lines 202, 204, 206, and 208, the exit lines 210, 212, 214, 216, 218, and 220 may also have a thickness proportional to a number of users exiting the pipeline at that point and may also include indicia of directionality.

In some implementations, a viewer of the pipeline (e.g., the user of the management computer 108) may be interested in distinguishing whether users have abandoned the pipeline go to another webpage within the same website or to an entirely different website. In this case, the webpages that are not part of the pipeline may be divided into two categories: those that are in the same website as the webpages in the pipeline and all other webpages. Accordingly, any type of abandonment may be similarly distinguished as internal-abandon/internal-exit from the pipeline to another webpage in the same website or external-abandon/external-exit leaving both the pipeline and the website to which the pipeline belongs. By being part of the same website, the webpages in the pipeline and the other webpages in that website share a particular characteristic namely inclusion in the same website. Although inclusion in the same website is one illustrative characteristic, webpages, and nodes in general, may be grouped by any other shared characteristic.

The internal-exit lines 210 and 212 extend from nodes 110 and 114 respectively toward the text "IN." The text "IN" may be replaced with a website name or any other visual indicator of an internal-exit to another node sharing a particular characteristic with the nodes in the pipeline. The internal-exit lines 210 and 212 may all point toward the inside of the curve. For a "bowl" shaped curve this may be lines pointing generally up and for a "dome" shaped curve this may be lines pointing generally down. The "IN," or other symbol of internal-exits, may be absent in which case the type of exit would be identifiable because the exit lines point to the inside of the curve. One or more destination nodes 222 within the "IN" category may be shown in the user interface 200. For example, several nodes within the "IN" category receiving the most exiting users (e.g. the top one, three, five, etc. internal-exit destination nodes) may be shown. Here, internal-exit line 220 represents users leaving node 110 for the node 222 which shares the particular characteristic with the other nodes in the pipeline. Showing the most popular destinations for internal-exits may be useful in troubleshooting pipeline design by identifying related nodes that were omitted from the pipeline analysis. Specific destinations for internal-exits may also be shown textually, for example, in a pop-up box.

The external-exit lines 214, 216, and 218 represent users leaving to a node which is not in the pipeline and does not share the particular characteristic with the nodes in the pipeline. The external-exit lines 214, 216, and 218 may point towards the text "OUT." The text "OUT" may be replaced with another symbol or indicator of external-exit, or it may be omitted entirely. The external-exit lines 214, 216, and 218 may point to towards the outside of the curve (i.e., away from the center of the curve). In this case, the directionality of the external-exit lines 214, 216, and 218 alone can distinguish these exit lines from the internal-exit lines 210 and 212.

Figure 3:
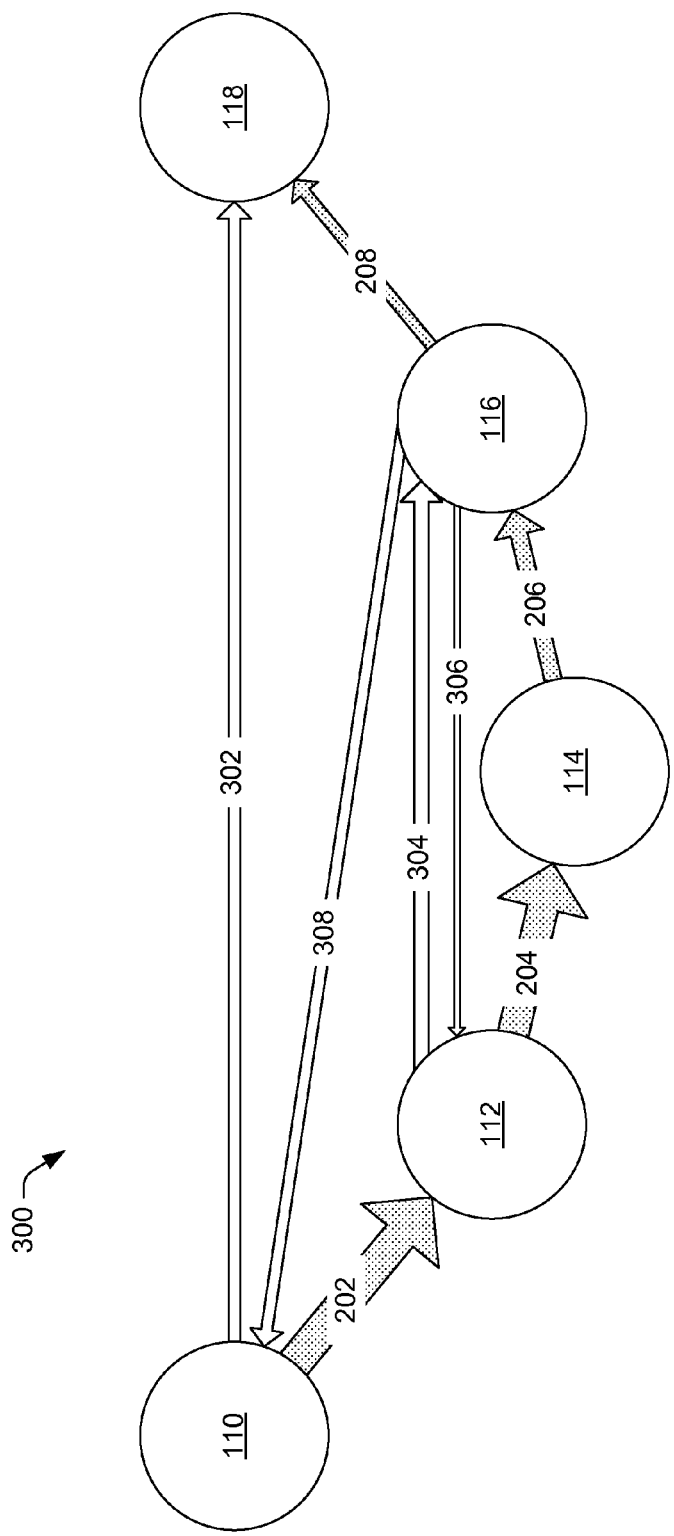
FIG. 3 shows the user interface from FIG. 2 with arrows indicating additional movement of users amongst the nodes.

FIG. 3 shows a user interface 300 similar to the user interface 200 shown in FIG. 2, but omitting the exit lines for the sake of clarity and including additional connecting lines representing users moving between the nodes 110, 112, 114, 116, and 118. As with FIG. 2, the connecting lines 202, 204, 206, and 208 represent users moving sequentially through the pipeline in the same order as the ordering of the nodes. Although a pipeline represents a series of nodes with a sequential order, in many instances there is no requirement for users to move through the pipeline in the designated, sequential order. Users may skip nodes and move backwards through the pipeline.

Connecting line 302 represents those users that moved directly from node 110 to node 118. In the checkout pipeline example, this may represent something like a one-click purchase in which the user proceeds from the product description webpage 110 to the purchase confirmation webpage 118 in a single step. By displaying the nodes 110, 112, 114, 116, and 118 in a curve on the user interface it is possible to connect the first node 110 with the final node 118 by a straight line 302 that does not cross over any other nodes.

Connecting line 304 represents those users that move from node 112 to node 116 without passing through the intervening node 114. Returning to the checkout pipeline example, this may represent those users who have saved their payment information, and thus can bypass the payment information webpage 114.

As well as skipping nodes in the pipeline, users may also move backwards in the pipeline. Connecting line 306 represents users returning from node 116 to node 112. In the checkout pipeline example, connecting line 306 may represent those users that realize when viewing the purchase review webpage 116 that their address is incorrect and then returned to the address confirmation webpage 112. Similarly, connecting line 308 may represent those users that view the purchase review webpage 116 and return to the product description webpage 110 possibly to confirm some feature of the product before finalizing the transaction.

As with the connecting lines 202, 204, 206, and 208 that follow the flow of the pipeline, the connecting lines 302, 304, 306, and 308 may vary in thickness and may include indicia of directionality. For example, the connecting lines entering and leaving node 116 (e.g., connecting lines 206, 208, 304, 306, and 308) graphically show where and how many users come to node 116 as well as where and how many users leave node 116. The thickness of the various connecting lines (e.g., connecting lines 206, 208, 304, 306, and 308) that intersect node 116 show the volume of user traffic to and from that node.

Figure 4:
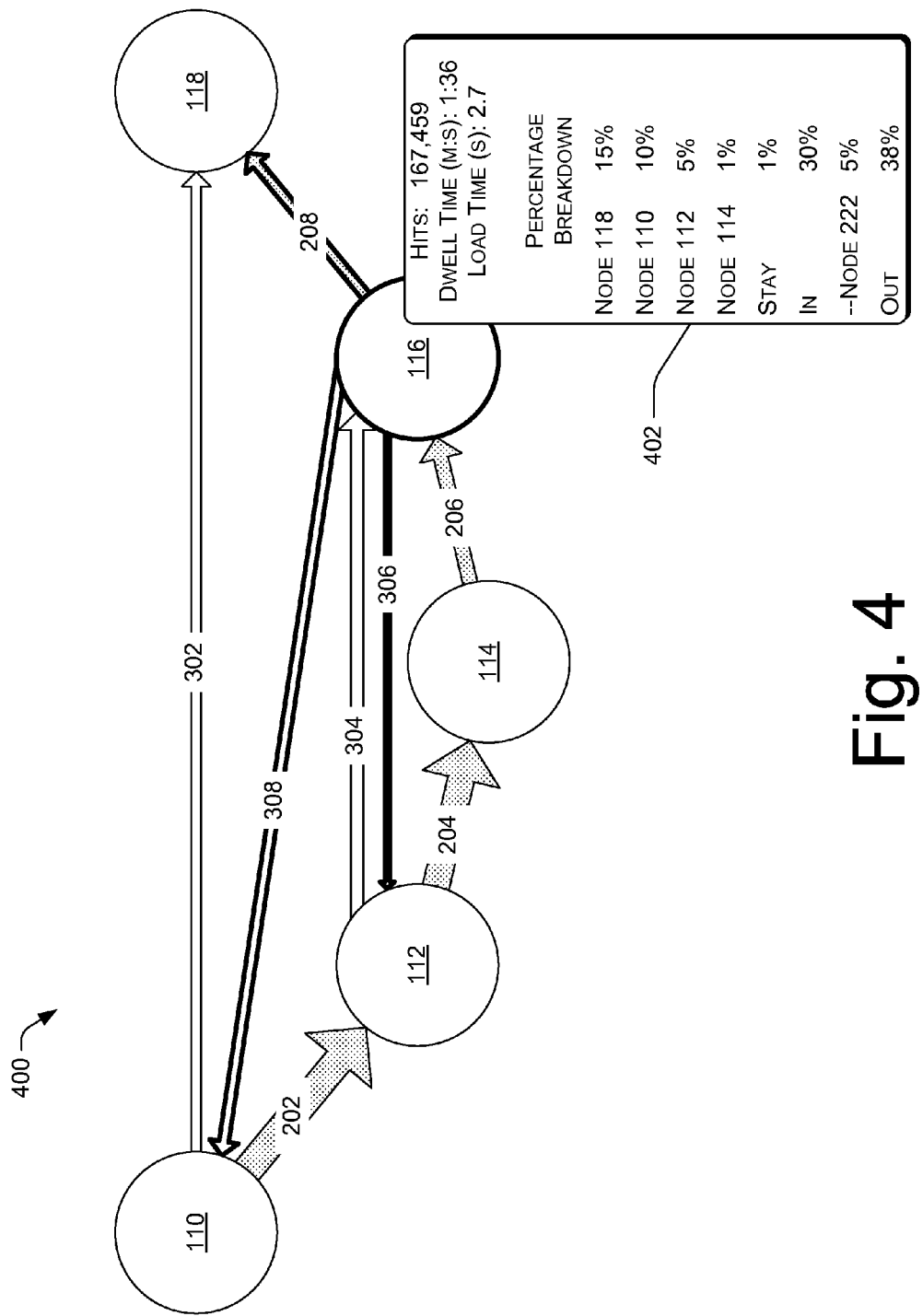
FIG. 4 shows the user interface from FIG. 3 with a pop-up box providing greater detail about a selected node.

FIG. 4 shows a user interface 400 similar to the user interface 300 of FIG. 3 with addition of a pop-up box 402 providing additional information about selected node 116. In FIG. 4 the nodes and the connecting lines between the nodes are the same as in FIG. 3. The pop-up box 402 may be displayed on the user interface in response to a user selecting one of the shapes representing a node such as the circle representing node 116. The selection of a node on the user interface may be implemented by clicking on the shapes representing the node, mousing over/hovering over the shapes representing the node, selecting the node with arrow keys, and the like. The pop-up box 402 may display in textual or numeric form information that is presented elsewhere on the user interface only graphically. For example, the pop-up box 402 may include an indication of a numbers of users leaving the webpage 116 and the respective destinations for the users leaving the webpage. This may provide more precise information than is discernable by comparing relative widths of the connecting lines. There may also be a threshold cutoff (e.g., <5%) below which user traffic is not illustrated graphically, but may be shown in the pop-up box 402. In this example, only 1% of the users travel from node 116 back to node 114. In order to simplify the appearance of the user interface 400, there may be no connecting line (e.g., a line going from node 116 to node 114) corresponding to this relatively small amount of user traffic.

The pop-up box 402 may also display additional information about the selected node that is not displayed elsewhere on the user interface. For example, in the user interface 400 user traffic exiting the pipeline is not shown graphically. The pop-up box 402 may include this information by indicating, for example, that 38% of the users abandoned the pipeline that node 116 for an external website and 30% abandoned for another webpage in the same website. The pop-up box 402 may also indicate specific webpages in the same website (e.g., node 222) that received a high proportion of the users that abandoned the pipeline. In some implementations the pop-up box 402 may include an indication of a number of users accessing the node, which in the context of a webpage may be the number of "hits" that the webpage receives, a dwell time indicating how long users remain at the selected node, a load time indicating how long it takes the webpage corresponding to the selected node to load, details about the type of users accessing the node (e.g., new visitors, repeat visitors, members of the website, etc.), how a user transitioned from one node to another (e.g., where on a webpage the user clicked to initiate the movement), and other data about user-node interaction. Since pipeline analysis generally examines aggregate behavior of many users, user data such as the data mentioned above may be presented as an average value, a median value, a range of values (e.g., 50% confidence interval; a listing of max, mean, and minimum values, etc.), and any combination of other statistical metrics which can be derived from a plurality of data samples.

Figure 5:
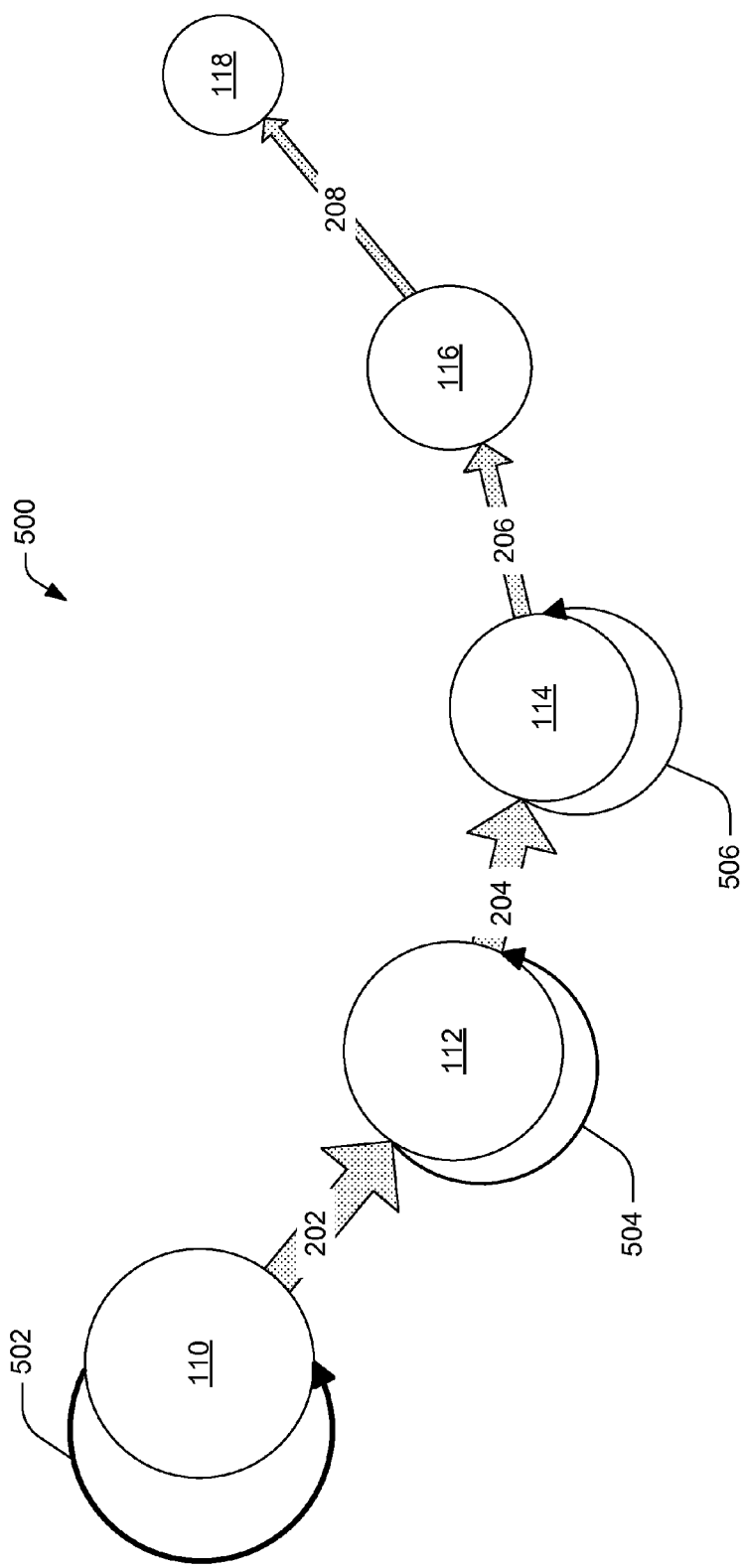
FIG. 5 shows the user interface from FIG. 2 with varying node size and visual representations of users that return to a node.

FIG. 5 shows a user interface 500 similar to the user interface 200 of FIG. 2, but omitting the exit lines for the sake of clarity and including further visual elements 502, 504, and 506 representing a number of users that return to a node. The size or thickness of the visual elements 502, 504, and 506 may be based at least in part on the number of users that return to the corresponding node (e.g., 110, 112, or 114). The number of returning visitors to node 110 is represented by the line 506 arcing away from and then returning to node 110. The number of returning visitors to nodes 112 and 114 is indicated by similar arced lines 504 and 506 respectively. Here, a thickness of line 502 is greater than a thickness of line 504 which in turn is thicker than line 506. This relative thickness of the lines 502, 504, and 506 represents differences in the number of users that return to the corresponding nodes (e.g., 110, 112, and 114).

The size of the visual elements representing the nodes themselves 110, 112, 114, 116, and 118 may be based at least in part on a level of user traffic through each node (e.g., node 110 receives more traffic than node 118 and therefore the node 110 is represented by a larger circle than node 118). In other implementations, the size of the visual elements representing the nodes 110, 112, 114, and 116, and 118 may be based at least in part on a length of time users spend at each node. In this implementation, the decrease in the relative size of the circles representing the nodes 110, 112, 114, 116, and 118 may indicate that the users spend progressively less time at each node in the pipeline.

The users that return to the node may include users that have traveled to another node in the pipeline or to a node outside the pipeline during the current session. The users that return to the node may also include users that have visited the node during a previous session (i.e., repeat visitors). In one implementation, the returning users are shown by shapes that at least partially overlap the visual elements representing the nodes 110, 112, and 114. For example, in the user interface 500 other circles representing returning visitors could appear as "shadows" underneath the circles representing the respective nodes 110, 112, and 114. In other implementations, visual elements representing returning users may overlap in such a way as to not appear as "shadows," may be located next to the corresponding nodes, or may be visualized in some other manner such as the arced lines described above. The number of returning visitors to a node may additionally or alternatively be included in the pop-up box 402 shown in FIG. 4.

Figure 6:
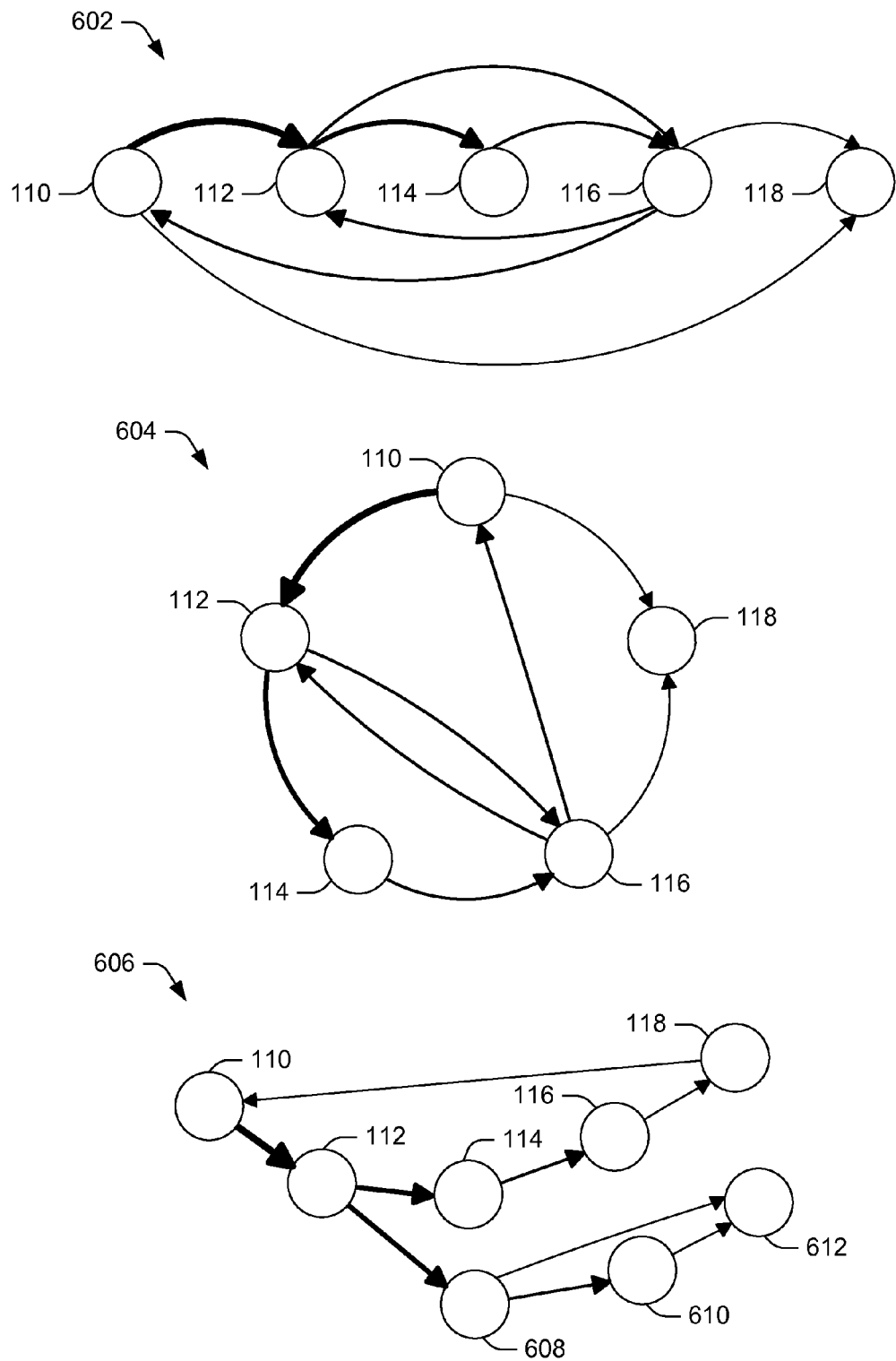
FIG. 6 shows several alternative user interfaces.

FIG. 6 shows several alternative user interfaces for visualizing movement of users through a pipeline. In one implementation, a user interface 602 may show the nodes 110, 112, 114, 116, and 118 of a pipeline arranged in a straight line. The nodes 110, 112, 114, 116, and 118 and the connecting lines between the nodes are the same as shown in the user interface 400 of FIG. 4 above. User traffic between the nodes 110, 112, 114, 116, and 118 may be illustrated with arrows and the thickness of the arrows may depend on the number of users moving between the nodes connected by the respective arrows. In this user interface 602, the arrows are curved so that no arrow crosses over any other arrow.

In an alternative user interface 604, the nodes 110, 112, 114, 116, and 118 are arranged in a circle. As with the user interface 602 above, the nodes 110, 112, 114, 116, and 118 and the connecting lines between the nodes in this user interface 604 are the same as shown in the user interface 400 of FIG. 4 above. In this example, the first node 110 in the pipeline is at the 12 o'clock position in the circle and the pipeline proceeds counterclockwise around the circle. However, the first node 110 in the pipeline may be located at any position in the circle and the direction of the pipeline may be clockwise or counterclockwise.

A pipeline may also include one or more branch points as shown in the user interface 606 at the bottom of FIG. 6. In this user interface 606, the nodes 110, 112, 114, 116, and 118 for the first branch of the pipeline are arranged in a curve similar to FIGS. 2-5. A second branch of the pipeline includes some of the same and some different nodes 110, 112, 608, 610, and 612 also arranged in a curve. In this pipeline, the branch point is at node 112. Returning to the checkout pipeline example introduced in FIG. 1, node 112—the address confirmation webpage—may send international users down a different branch of the checkout pipeline than domestic users. The pipeline may be designed so that once the user takes one of the branches (e.g., nodes 114, 116, and 118 or nodes 608, 610, and 612) user traffic will not travel between the branches. Although only one branch point is illustrated in this user interface 606, a pipeline in the user interface representing the pipeline may include any number of branch points.

Figure 7:
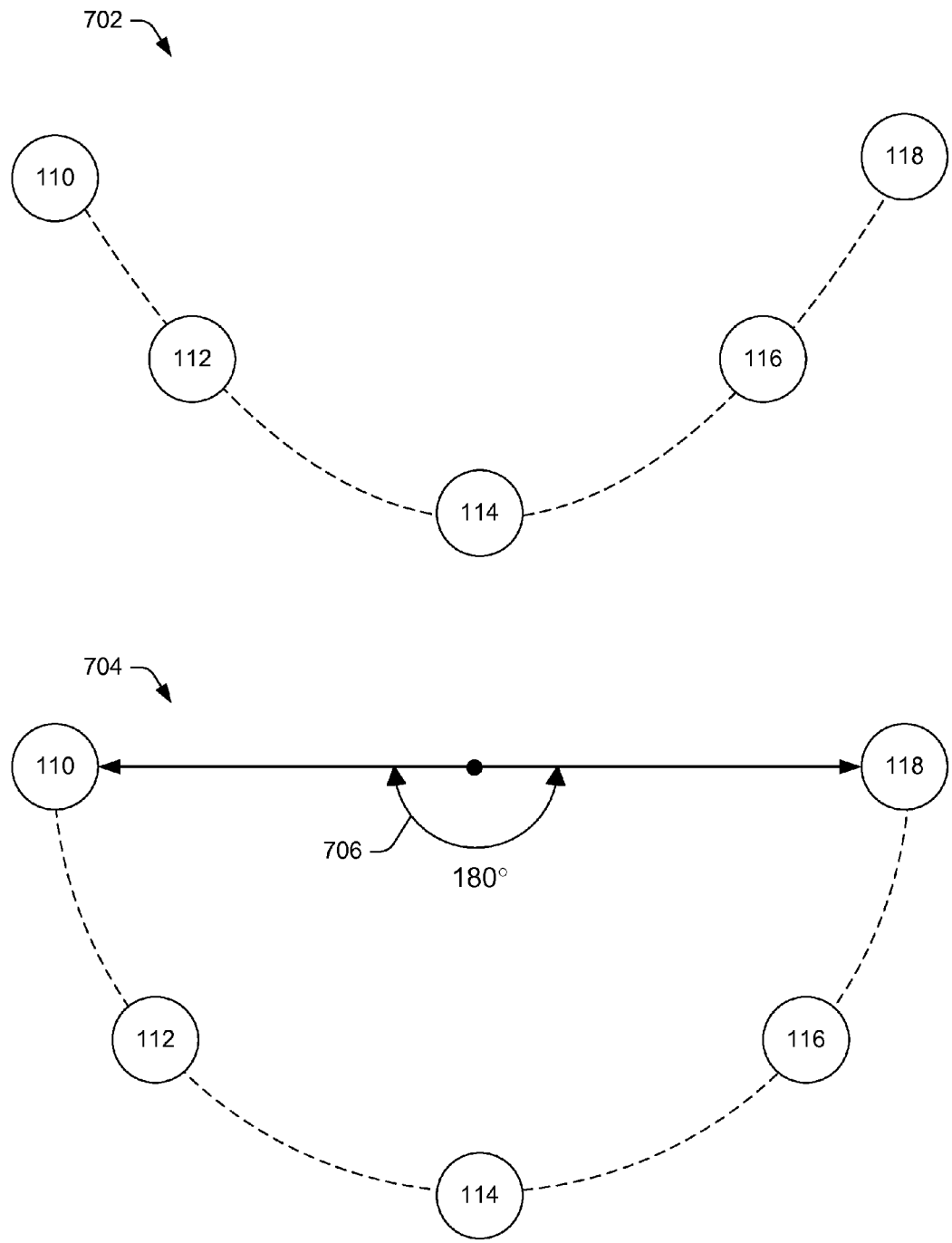
FIG. 7 shows a series of nodes displayed along a parabola and along a semicircle.

FIG. 7 shows two illustrative curves for displaying a user interface such as the user interfaces discussed in FIGS. 2-5. For the sake of clarity, only the nodes 110, 112, 114, 116, and 118 are shown in FIG. 7. A user interface showing nodes arranged in a curve may have any degree of curvature greater than a straight line (e.g., the user interface 602 shown in FIG. 6), but less curve than a closed circle (e.g., the user interface 604 shown in FIG. 6).

In one implementation, the nodes 110, 112, 114, 116, and 118 in a user interface 702 may be arranged in a parabola. An amount of curvature between the nodes 110, 112, 114, 116, and 118 and the depth and breadth of the parabola may be adjusted by altering parameters used to generate the parabola.

In another implementation, the nodes 110, 112, 114, 116, and 118 in a user interface 704 may be arranged along an arc of a circle. An amount of curvature in the art of the circle is determined by the size of a central angle 706 defining the arc. In this illustrative user interface 704, the size of the central angle 706 is 180°. The central angle 702 may be any size greater than 0° and less than 360°. In some implementations the central angle 706 may be between about 20° and about 180°.

Illustrative Computing Device

Figure 8:
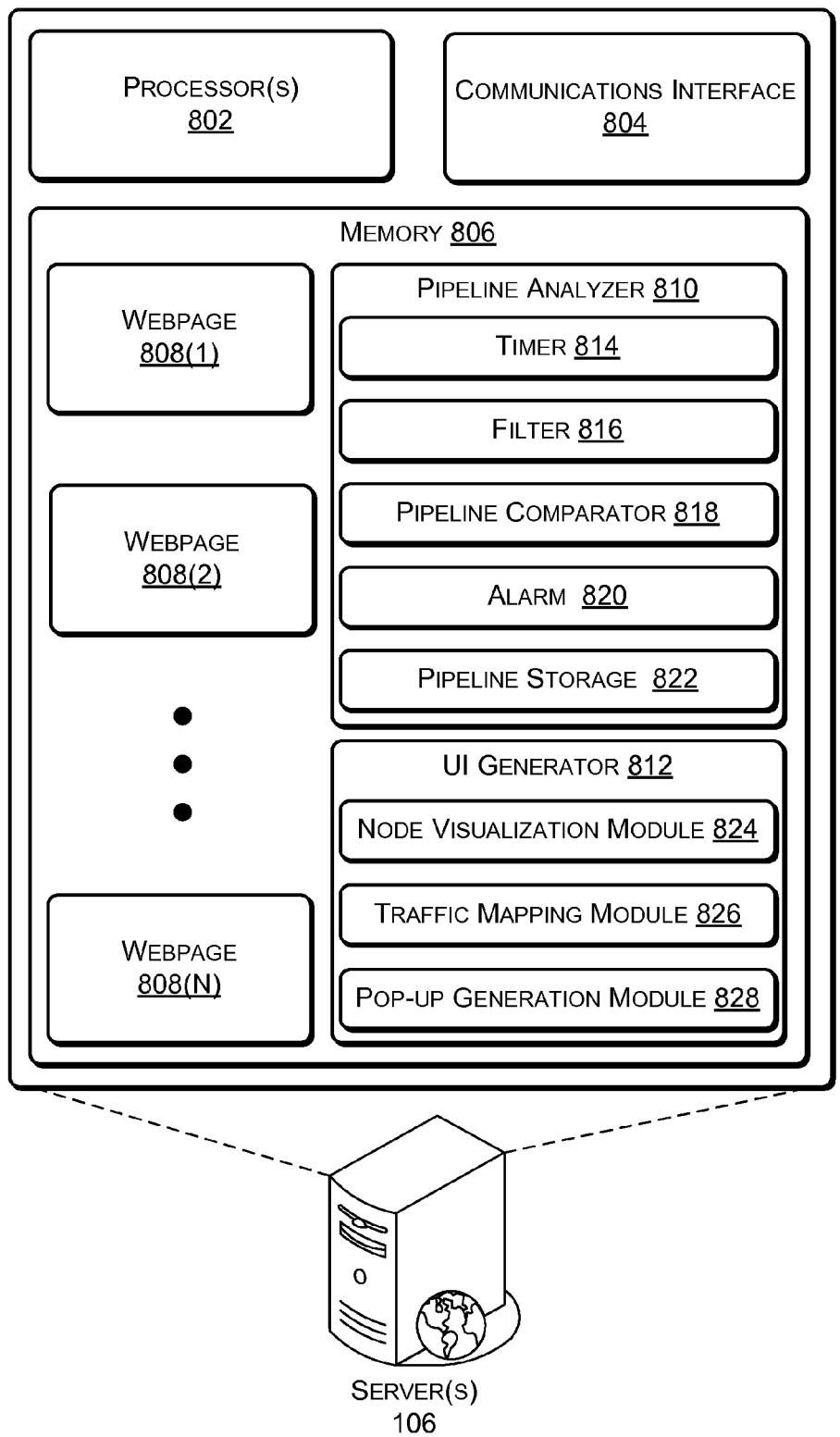
FIG. 8 is the server of FIG. 1 in greater detail.

FIG. 8 shows the server(s) 106 of FIG. 1 in greater detail. The server(s) 106 includes one or more processors 802 and may also include a communications interface 804 to exchange data with the management computer 108 and/or the network 104 shown in FIG. 1. The server(s) 106 may also include components that function as a memory 806 to store data and/or computer-readable instructions.

In some implementations, the server(s) 106 may be a web server that stores a plurality of webpages 808(1), 808(2), and 808(N), where N is any number greater than 1. The webpages 808(1), 808(2), and 808(N) may make up all or part of a website and the pipeline may include some or all of these webpages 808(1), 808(2), and 808(N). In implementations in which the nodes are not websites (e.g., the nodes may be geographical locations) it may not be possible for the memory 806 to contain the nodes. However, the memory 806 may contain data related to the nodes such as, for example, a map to which actual geographic locations can be correlated.

The memory 806 may include a pipeline analyzer 810 configured to analyze user traffic through an ordered pipeline of nodes such as the checkout pipeline shown in FIG. 1. The memory 306 may also include a user interface (UI) generator 812 configured to generate a UI that displays user traffic through the nodes of the pipeline. The user interface generated by the UI generator 812 may be the same or similar to any of illustrated in FIGS. 2-7.

The pipeline analyzer 810 may include a timer configured to start and end a run of data collection of the user traffic through the pipeline of nodes. In some systems having nodes, such as a website with webpages, users may continuously access and interact with the nodes. This creates a stream data from which user interfaces may be generated. One technique for analyzing the data is to take a snapshot in time or to collect data only for a defined period of time. This may also save computing resources as compared to continually re-generating a user interface from pipeline data. For example, a run of data collection may be for one hour, one day, one week, etc. The timer 814 may allow someone who wishes to analyze user-node interactions to select a specific period of time for analysis. For example, pipeline data may be collected for one week prior to a redesign of a website. Similarly, someone may be interested in analyzing only user activity during the daytime for example from 8 AM to 8 PM. The pipeline analyzer 810 may also function without the timer 814. For example, the pipeline analyzer 810 may analyze past data, such as the previous 24 hours of website activity, rather than future data captured at times indicated by the timer 814.

The pipeline analyzer 810 may also include a filter 816 configured to remove data collected during a run of data collection prior to generation of a user interface displaying the data. The filter 816 may selectively remove any subset of data from the data used to generate the user interface showing the pipeline. For example, in the context of webpages within a website, users that are members of that website may be identified differently than users without a membership and the filter 816 may allow the pipeline analyzer 810 to provide data to the UI generator 812 so that behavior of member and nonmember users may be viewed separately.

The pipeline analyzer 810 may also include a pipeline comparator configured 118 to compare data from two or more runs of data collection. One aspect of pipeline analysis or web analytics includes observing changes over time. The timer 814 may be set to obtain multiple runs of data collection for example, a data collection run one day before a promotion of a new product starts and a data collection run one day after the promotion has begun. Historical data may also be compared by the pipeline comparator 816. For example, yesterday's data may be compared with data collected one year ago. The pipeline comparator 118 may detect changes or differences in user behavior between multiple sets of collected pipeline data.

In some implementations, the pipeline analyzer 810 may perform analysis of pipeline data without passing that data to the UI generator 812 for display in a user interface. For example, an alarm 820 in the pipeline analyzer 810 may be configured to generate an indication or alert when the pipeline comparator 818 detects a change between runs of data collection. A manager of a website, or other collection of nodes, may set the timer 814 to collect data every day, every hour, or at some other frequency. The manager may also indicate a threshold amount of change for a given metric of the pipeline (e.g., percent of the user attrition between the first node and the final node) and the alarm 820 may generate the indication or alert when the metric changes more than the threshold amount.

The pipeline analyzer 810 may also include a pipeline storage 822 configured to store data collected during the run of data collection. Each batch of pipeline data collected, such as data collected during a time interval set by the timer 814, may be stored as a separate group of pipeline data in the pipeline storage 822. Different managers or users of the server(s) 106 may ask the system to collect data for different pipelines looking at user interactions with different sets of nodes and each of these may be stored in the pipeline storage 822. The identity of the person who requested the pipeline may also be stored in association with the pipeline in the pipeline storage 822. In some implementations, one or more of the runs of data collection that are compared by the pipeline comparator 818 may be stored in the pipeline storage 822.

The UI generator 812 may include various modules for generating user interfaces such as those discussed above. The UI generator 812 may include a node visualization module 824 configured to generate visual representations of each node in the pipeline of nodes. In some implementations, the visual representations may be aligned in a curve in the order the nodes appear in the pipeline. For example, a curve may be a parabola or an arc of a circle as shown in FIG. 7. In some implementations, the node visualization module 824 may generate visual representations of each node having a size that is based at least in part on a level of user traffic through each node or on a length of time users spend at each node as shown in FIG. 5.

The UI generator 812 may also include a traffic mapping module 826 configured to generate indications of traffic between nodes. In some implementations, the indications may be lines connecting two nodes and the lines may include some indicia of directionality such as an arrowhead. A size of the indications (e.g., thickness of the lines) may be based at least in part on an amount of user traffic moving between the nodes. For example, the traffic mapping module 826 may generate the arrows shown in FIG. 3 above.

The UI generator 812 may also include a pop-up generation module 828 configured to display additional information about a node in the pipeline of nodes when the node is selected. The node may be selected by clicking on an image representing the node, hovering a mouse cursor over an image representing the node, or by another technique. The user interface generated by the pop-up generation module 828 may be similar to the user interface 400 shown in FIG. 4 above. In some implementations, the additional information displayed in the pop-up may include information that is not displayed elsewhere in the user interface and/or it may include information that is displayed elsewhere on the user interface only graphically but not as text or numbers.

Illustrative Processes

These process discussed below is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 9:
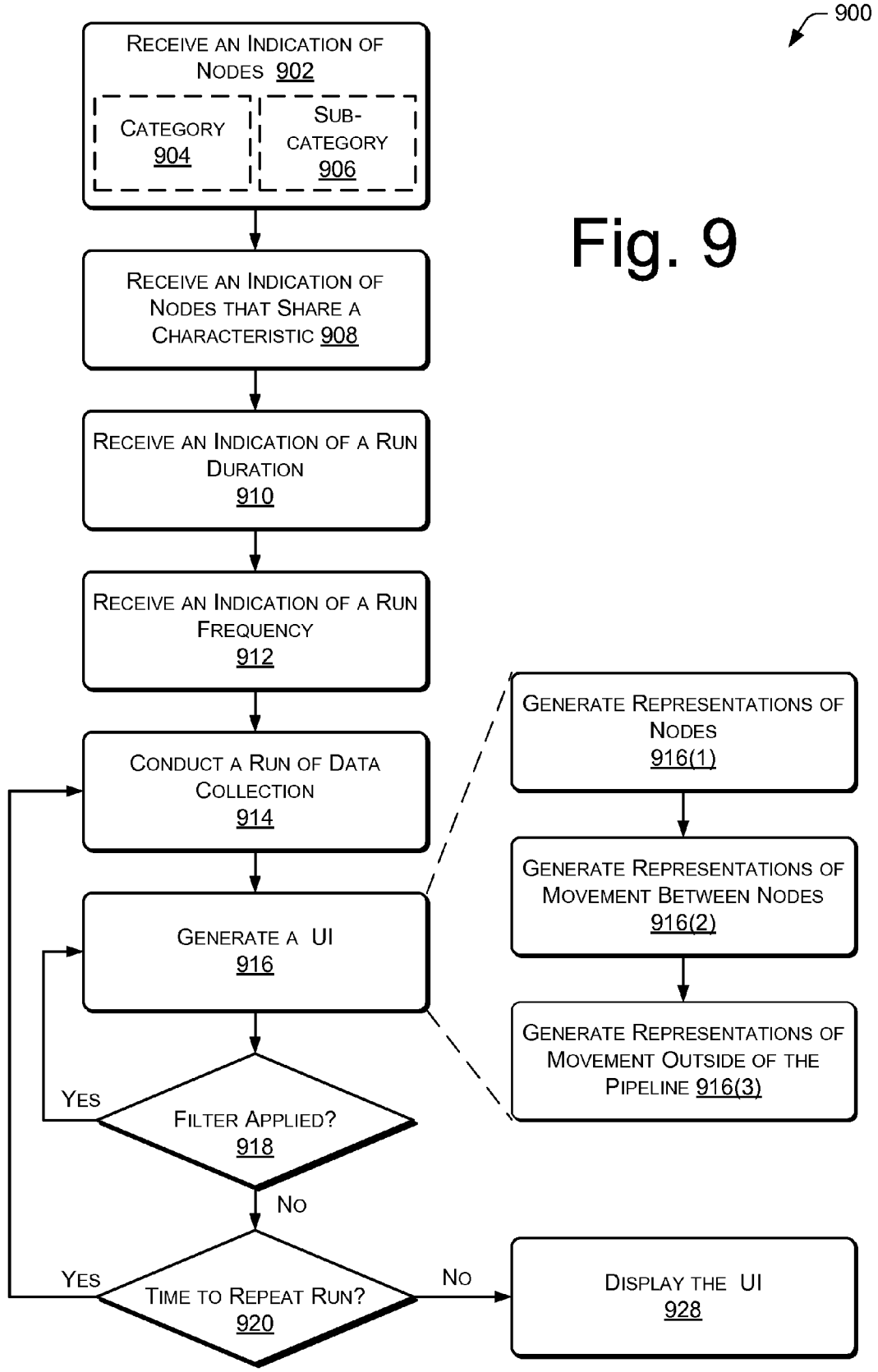
FIG. 9 is a flow diagram of an illustrative process for generating a user interface showing user-node interactions.

FIG. 9 shows an illustrative process 900 for generating a user interface showing interactions between users and nodes. At block 902, an indication of nodes for inclusion in a pipeline is received. The indication may include an ordering of the nodes such that the nodes in the pipeline are assigned a specific sequence (e.g., first, second, third, etc.). The indication of nodes may comprise an indication of a category of node 904 and/or a sub-category of node 906. The category of node 904 may allow a genus of nodes to be defined as one of the nodes in the pipeline. For example, in the context of a retail website a category of node 904 may be a product description page and the user that browses to any product description page, without regard to which particular product is described, may be considered to have passed through that node of the pipeline. Similarly if the pipeline is based on geography rather than webpages, the nodes may represent cities and the category of node 904 may be a county, thus any vehicle that passed through a city in that county would be considered to have passed through the "county node." The sub-category of node 906 allows greater levels of specificity within a category of node 904 (e.g., product description page as the category and consumer electronics description page as the sub-category or state as the category and county as the sub-category). Further levels of the specification and hierarchy are also possible such as sub-subcategories and the like.

At block 908, an indication of nodes outside of the pipeline that share a particular characteristic with the nodes in the pipeline is received. All nodes that exist in a universe of nodes can be divided into nodes in the pipeline and nodes outside of the pipeline. However, of the nodes outside of the pipeline, some or all of them may share a particular characteristic with the nodes in the pipeline. In the website implementation, the particular characteristic shared between nodes in the pipeline and some of the nodes outside of the pipeline may be inclusion in a same website. Designation of nodes that are outside of the pipeline but still share a particular characteristic with the nodes in the pipeline may allow for more detailed analysis of where users go when they abandon the pipeline.

At block 910, an indication of a run duration is received. Each user interface displaying user-node interactions is generated from a set of data collected during a period of time bounded by a start time and an end time. This length of time is the run duration. There may be a desire to study user-node interactions over a defined length of time, and thus, a data collection process may be run for this defined length of time. For example, data may be continuously collected for one day which is a run duration of 24 hours.

At block 912, an indication of a run frequency is received. When the run of data collection is specified to run more than once, the frequency at which the run is the repeated is the run frequency. The separate set of data collected for each run may be saved such, for example, in the pipeline storage 822. The user interface may be regenerated with each run to show a recent state of user-node interaction.

At block 914, data about movement of users through the pipeline defined by indicated nodes for the time indicated by the run duration is collected by conducting the run. Collecting data for the run of data collection may involve retrieving data from a data store such as a web server log file.

At block 916, a user interface including representations of each of the indicated nodes arranged in a curve in the indicated order is generated. The user interface may appear similar to the user interfaces shown in FIGS. 2-5. Generating the user interface may include generating representation of nodes at block 916(1). In some implementations, a size of the representations of the nodes depends at least in part on a length of time users spend at each node and/or a number of users that pass through each node during the run. At block 916(2), representations of user movement between nodes in the pipeline are generated. In some implementations, a size of the representations depends at least in part on a number of users that move between nodes. Generating the user interface may also include, at block 916(3), generating representations of user movement from nodes in the pipeline to the nodes outside of the pipeline that share the particular characteristic with the nodes in the pipeline (e.g., the nodes indicated at block 908; the arrows pointing to "IN" in FIG. 2). At block 926, representations of user movement from nodes in the pipeline to nodes outside of the pipeline that do not share the particular characteristic with the nodes in the pipeline may also be generated.

At decision point 918, it is determined if a characteristic on which to filter the data has been received. The characteristic may be a characteristic of these users such that data about users who do not share that characteristic is filtered out. In one implementation, this characteristic could be a way that users arrived at the first node in the pipeline. If, for example, the pipeline includes webpages the ways of arriving at the first node could include typing in a universal resource locator (URL), clicking on a link from a list of search results, clicking on a link in a paid search result, clicking on an advertisement, and the like. Information provided by the users' computers when requesting a webpage provides further a data with which to filter. For example, the webpage requests could contain geographic data (e.g., from an Internet protocol (IP) address), browser data (e.g., distinguish type of operating system based on the browser, mobile device or convention computer, and the like), and other types of data. If a filter is to be applied, process 900 proceeds along the "yes" path and returns to block 916 to regenerate the user interface using the filtered data. If there are no filters to be applied, process 900 proceeds along the "no" path to decision point 920.

At decision point 920, a determination is made as to if it is time to repeat a run of data collection. This determination references the indication of a run frequency received at block 912. It is time for the next run, process 900 proceeds along the "yes" path and returns to block 914 to collect updated data for the current run. Otherwise, operation 900 proceeds along the "no" path to block 922 and the user interface is displayed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed, cause one or more processors to render a user interface, the user interface comprising:
   a plurality of shapes representing respective webpages of a user-defined sequentially-ordered pipeline of webpages, wherein all shapes of the plurality of shapes are arranged in an arc in a same sequence as the pipeline and a size of individual shapes being based at least in part on a number of users accessing the respective webpage during a run period;
   a line representing users navigating from a first webpage in the pipeline to a second webpage in the pipeline during the run period, the line extending from a shape representing the first webpage to a shape representing the second webpage and a width of the line being based at least in part on a number of users navigating from the first webpage to the second webpage;
   one or more internal-exit lines pointing away from the plurality of shapes representing the pipeline and pointing inside of the arc, the one or more internal-exit lines representing users navigating to one or more webpages outside of the pipeline that are associated with a same website as the webpages of the pipeline of webpages; and
   one or more external-exit lines pointing away from the plurality of shapes representing the pipeline and pointing outside of the arc, the one or more external-exit lines representing users navigating to one or more webpages outside of the pipeline that are associated with a different website as the webpages of the pipeline of webpages.

2. The one or more non-transitory computer-readable media of claim 1, wherein the user interface further comprises one or more symbols inside of the arc, wherein individual symbols of the one or more symbols represent webpages outside of the pipeline that are associated with the same website as the webpages in the pipeline, and the one or more internal-exit lines point to the one or more symbols.

3. The one or more non-transitory computer-readable media of claim 1, wherein the user interface further comprises one or more symbols outside of the arc, wherein individual symbols of the one or more symbols represent the one or more webpages outside of the pipeline that are associated with a different website as the webpages in the pipeline, and the one or more external-exit lines point to the one or more symbols.

4. The one or more non-transitory computer-readable media of claim 1, wherein the user interface further comprises a message box generated in response to selection of one of the plurality of shapes, the message box comprising:
   an indication of an amount of users accessing the webpage corresponding to the selected shape during the run period;
   an indication of an amount of users leaving the webpage and respective destination webpages of the users leaving the webpage during the run period; and
   load time data for the webpage corresponding to the selected one of the plurality of shapes.

5. The one or more non-transitory computer-readable media of claim 1, wherein the line is displayed in response to determining that the number of users navigating from the first webpage to the second webpage exceeds a threshold.

6. One or more non-transitory computer-readable media storing computer-executable instructions that, when executed, cause one or more processors to render a user interface for displaying analytics derived from a pipeline, the user interface comprising:
- a plurality of visual elements representing respective webpages arranged in an arc in a same order as a user-defined order of webpages, wherein individual visual elements of the plurality of visual elements represent a respective node of a plurality of nodes of the pipeline;
- a connecting line connecting two of the visual elements and having a thickness proportional to a number of users moving from a first node of the plurality of nodes to a second node of the plurality of nodes; and
- one or more exit lines pointing away from the plurality of visual elements arranged in the arc, wherein the one or more exit lines represent users navigating to webpages that are excluded from the user-defined order of webpages and the one or more exit lines include external-exit lines extending from one of the plurality of nodes to visual indicators located in a region of the user interface outside of the arc, the visual indicators representing webpages that are not associated with a same website as the webpages arranged in the arc.

7. The one or more non-transitory computer-readable media of claim 6, wherein the plurality of nodes comprises at least one branch point.

8. The one or more non-transitory computer-readable media of claim 6, wherein at least one of the plurality of nodes comprises a discrete computer-generated presentation.

9. The one or more non-transitory computer-readable media of claim 6, wherein the visual element representing the respective node is circular or approximately circular in shape.

10. The one or more non-transitory computer-readable media of claim 6, wherein at least one of the users comprises a viewer of a website.

11. The one or more non-transitory computer-readable media of claim 6, wherein the arc comprises a segment of a circle having a central angle of about 20° to about 180°.

12. The one or more non-transitory computer-readable media of claim 6, wherein the connecting line, the one or more exit lines, or the connecting line and the one or more exit lines include indicia of directionality.

13. The one or more non-transitory computer-readable media of claim 6, wherein the user interface further comprises an additional visual element representing an amount of users that return to the respective node.

14. The one or more non-transitory computer-readable media of claim 6, wherein the one or more exit lines have thicknesses proportional to a number of users exiting the pipeline from the any one of the plurality of nodes.

15. The one or more non-transitory computer-readable media of claim 6, wherein the one or more exit lines include internal-exit lines extending from one of the plurality of nodes to visual indicators located in a region of the user interface inside of the arc, the visual indicators representing webpages that are associated with a same website as the webpages arranged in the arc.

16. The one or more non-transitory computer-readable media of claim 6, wherein the connecting line is displayed in response to determining that the number of users moving from the first node to the second node exceeds a threshold.

17. The one or more non-transitory computer-readable media of claim 6, wherein a size of the individual visual elements is based at least in part on a number of users that have accessed the respective node.

18. A computer-implemented method comprising:
under control of one or more computer systems configured with executable instructions,
- receiving an indication of nodes for inclusion in a pipeline, the indication including an ordering of the nodes;
- receiving an indication of a run duration;
- collecting data comprising user movement between the nodes of the pipeline during the run duration; and
- generating a user interface (UI) including:
  - generating first representations, the first representations representing individual nodes of the nodes, wherein each of the nodes is arranged in an arc in the indicated order;
  - generating second representations, the second representations representing the user movement between the nodes in the pipeline; and
  - generating third representations, the third representations representing user movement away from the nodes in the pipeline to visual indicators outside of the pipeline, the third representations including:
    - one or more of the third representations that point to first visual indicators outside of the pipeline that are located in a region of the UI that is inside of the arc, wherein the first visual indicators represent nodes that share a particular characteristic with the nodes in the pipeline; and
    - one or more different representations of the third representations that point to second visual indicators outside of the pipeline that are located in a region of the UI that is outside of the arc, wherein the second visual indicators represent nodes that do not share the particular characteristic with the nodes in the pipeline.

19. The method of claim 18, wherein the indication of nodes comprises an indication of a category of node.

20. The method of claim 18, wherein the indication of nodes comprises an indication of a category of node and an indication of a sub-category of node.

21. The computer-implemented method of claim 18, wherein a size of the second representations depends at least in part on an amount of users that move between nodes.

22. The method of claim 18, further comprising:
receiving a characteristic on which to filter the data;
filtering the data; and
regenerating the UI using the filtered data.

23. The method of claim 22, wherein the filter is based on a characteristic of the users.

24. The method of claim 22, wherein a display of the first representations depends at least in part on a determination of whether users that visited the nodes are returning users at the individual nodes.

25. The method of claim 22, wherein the nodes represent webpages and the indicated order comprises a user-defined sequential order of the webpages.

26. The method of claim 25, wherein the particular characteristic comprises being associated with a same website as the webpages of the pipeline.

27. A computing device comprising:
one or more processors; and
a memory coupled to the one or more processors and comprising:
- a pipeline analyzer configured to analyze user traffic through a user-defined ordered pipeline of nodes, the pipeline analyzer comprising:
  - a timer configured to start and end a run of data collection of the user traffic through the pipeline of nodes;
  - a filter configured to remove data collected during the run of data collection prior to generation of a user interface (UI) displaying the data; and a pipeline storage configured to store data collected during the run of data collection; and a UI generator configured to generate a UI that displays user traffic through the nodes of the pipeline, the UI generator comprising:

a node visualization module configured to generate visual representations of nodes in the pipeline of nodes, each of the visual representations aligned in an arc in a same order the nodes appear in the pipeline and a size of the nodes being dependent on one or more types of users that accessed the nodes; and a traffic mapping module configured to generate indications of user traffic between the nodes in the pipeline and between the nodes in the pipeline and visual indicators outside of the pipeline, wherein the indications include:

first representations representing user traffic between the nodes in the pipeline;

second representations representing user traffic from a node of the nodes in the pipeline to a first visual indicator outside of the pipeline, wherein the first visual indicator represents a node that shares a particular characteristic with the nodes in the pipeline, the second representations pointing in a direction away from the arc; and third representations representing user traffic from a node of the nodes in the pipeline to a second visual indicator outside of the pipeline, wherein the second visual indicator represents a node that does not share the particular characteristic with the nodes in the pipeline, the third representations pointing in a different direction away from the arc.

28. The device of claim 27, wherein the nodes comprise webpages and the memory further comprises data encoding at least part of the webpages.

29. The device of claim 27, wherein the node visualization module generates visual representations of the individual nodes having a size that is based at least in part on a level of user traffic through the individual nodes.

30. The device of claim 27, wherein the pipeline analyzer further comprises a pipeline comparator configured to compare data from two or more runs of data collection.

31. The device of claim 30, wherein the pipeline analyzer further comprises an alarm configured to generate an indication when the pipeline comparator detects a change between runs of data collection that exceeds a threshold amount.

* * * * *